(12) United States Patent
Brown et al.

(10) Patent No.: US 12,005,347 B2
(45) Date of Patent: Jun. 11, 2024

(54) IN OR RELATING TO GAMING CONTROLLERS

(71) Applicant: SINDEN TECHNOLOGY LTD, Coventry (GB)

(72) Inventors: Garry Brown, Coventry (GB); Andrew James Sinden, Coventry (GB)

(73) Assignee: SINDEN TECHNOLOGY LTD, Coventry (GB)

( * ) Notice: Subject to any disclaimer, the term of this patent is extended or adjusted under 35 U.S.C. 154(b) by 0 days.

(21) Appl. No.: 18/258,363

(22) PCT Filed: Dec. 17, 2021

(86) PCT No.: PCT/GB2021/053347
§ 371 (c)(1),
(2) Date: Jun. 20, 2023

(87) PCT Pub. No.: WO2022/129934
PCT Pub. Date: Jun. 23, 2022

(65) Prior Publication Data
US 2023/0398440 A1  Dec. 14, 2023

(30) Foreign Application Priority Data
Dec. 17, 2020  (GB) ..................... 2020069

(51) Int. Cl.
*A63F 13/24* (2014.01)
*A63F 13/219* (2014.01)
(Continued)

(52) U.S. Cl.
CPC .......... *A63F 13/245* (2014.09); *A63F 13/219* (2014.09); *A63F 13/285* (2014.09);
(Continued)

(58) Field of Classification Search
CPC .... A63F 13/245; A63F 13/219; A63F 13/285; A63F 13/837; A63F 13/23; H01F 7/081
See application file for complete search history.

(56) References Cited

U.S. PATENT DOCUMENTS 6,509,896 B1 * 1/2003 Saikawa ................. G06T 19/00
345/419
6,545,661 B1 * 4/2003 Goschy ................. A63F 13/211
345/158

(Continued)

FOREIGN PATENT DOCUMENTS

| CN | 206342925 U | 7/2017 |
|---|---|---|
| EP | 3224125 A1 | 10/2017 |
| TW | 201307791 A | 2/2013 |

OTHER PUBLICATIONS

International Search Report and Written Opinion dated Feb. 28, 2022 in corresponding International Application No. PCT/GB2021/053347; 10 pages.

(Continued)

*Primary Examiner* — Justin L Myhr
*Assistant Examiner* — Carl V Larsen
(74) *Attorney, Agent, or Firm* — Maier & Maier, PLLC (57) ABSTRACT

An electronic device for discharging a pulse of current includes an energy storage medium for receiving and storing electric energy supplied from a power source, a solenoid and a control switch connectable with the energy storage medium and the power source and configured to discharge a pulse of current for energising the solenoid when the control switch is activated, whereby the solenoid moves from a first position when the solenoid is not energised, into a second position when the solenoid is energised, and the energised solenoid generates and supplies a current back to the energy storage medium, a processor configured to process the time taken to energise the solenoid, monitor the (Continued)

current drawn by the solenoid from the energy storage medium, and control at least one parameter of a discharged pulse; and an output module to control the discharge of the current from the energy storage medium to the solenoid.

17 Claims, 4 Drawing Sheets

(51) Int. Cl.
  *A63F 13/245* (2014.01)
  *A63F 13/285* (2014.01)
  *A63F 13/837* (2014.01)
  *H01F 7/08* (2006.01)
  *A63F 13/23* (2014.01)

(52) U.S. Cl.
  CPC ............ *A63F 13/837* (2014.09); *H01F 7/081* (2013.01); *A63F 13/23* (2014.09)

(56) References Cited

U.S. PATENT DOCUMENTS

| | | | | |
|---|---|---|---|---|
| 9,810,502 | B2* | 11/2017 | Monti | F41A 33/06 |
| 10,852,093 | B2* | 12/2020 | Monti | A63F 13/837 |
| 11,194,396 | B1* | 12/2021 | Wang | G06F 3/016 |
| 11,314,339 | B2* | 4/2022 | Sinden | A63F 13/426 |
| 2003/0155444 | A1* | 8/2003 | Lawes | F02M 51/04 |
| | | | | 239/585.1 |
| 2007/0117628 | A1* | 5/2007 | Stanley | A63F 13/212 |
| | | | | 463/36 |
| 2010/0167820 | A1* | 7/2010 | Barakat | A63F 13/212 |
| | | | | 463/40 |
| 2012/0302348 | A1* | 11/2012 | Karacal | A63F 13/837 |
| | | | | 463/38 |
| 2014/0287806 | A1* | 9/2014 | Balachandreswaran | |
| | | | | A63F 13/428 |
| | | | | 463/7 |
| 2016/0018185 | A1* | 1/2016 | Makohon | F41C 27/00 |
| | | | | 42/90 |
| 2016/0292924 | A1* | 10/2016 | Balachandreswaran | |
| | | | | G06F 3/012 |
| 2019/0278369 | A1* | 9/2019 | Ballard | A63F 13/285 |
| 2019/0351297 | A1* | 11/2019 | Wolfe | A63B 71/0619 |
| 2020/0064922 | A1* | 2/2020 | Nocon | G06F 3/016 |
| 2021/0164751 | A1* | 6/2021 | Monti | F41A 33/06 |
| 2022/0387724 | A1* | 12/2022 | Helmer | A61M 5/31578 |

OTHER PUBLICATIONS

Search Report dated Jun. 2, 2021, in corresponding British Application No. GB2020069.7, 2 pages.
Examination Report dated Jul. 13, 2021, in corresponding British Application No. GB2020069.7, 2 pages.
Sinden Technology., "The Sinden Lightgun", Kickstarter.com, 2021, 12 pages.
Notification of Grant dated Apr. 18, 2023, in corresponding British Application No. GB2020069.7, 2 pages.
Sinden Technology, "First look at Sinden lightgun Recoil unit!", https://www.youtube.com/watch?v=YZxbNMy114M; 1 page.

* cited by examiner

IN OR RELATING TO GAMING CONTROLLERS

FIELD

The present invention relates to a gaming controller for use in computer games played on modern displays and, in particular, a gaming controller provided with a recoil feature. A gaming controller is a physical device used to control a computer game or computer simulator. As such, a gaming controller includes, but is not limited to lightguns, gamepads, driving steering wheels, flight yokes, virtual pinball buttons and joysticks.

BACKGROUND

Lightguns are gaming or simulator controllers where a user points a controller device at a display and shoots or otherwise interacts with targets displayed on the screen.

Solenoids are used in many applications such as haptic feedback in video games, pinball machines, opening electronic locks, controlling valves on sprinkler systems and many more. It is common to drive these solenoids directly from an available power supply.

However, the issues with current solenoid integration in existing devices are that they require a very powerful power supply to provide enough current to directly energise the solenoid which is expensive and inefficient. Additionally in this type of integration the solenoid generates a lot of heat which interferes with the functionality and creates more wear and tear on the solenoid so it can break sooner.

Therefore, there is a requirement to provide a device comprising an advanced circuit to control and monitor a solenoid in order to give more flexibility in controlling the solenoid as well as reducing power supply requirements, reducing heat, removing the requirement for additional sensors (such as a temperature sensor) and increase the usable lifetime of a solenoid.

SUMMARY

It is against this background that the present invention has arisen.

In an aspect of the present invention, there is provided an electronic device for discharging a pulse of current, the device comprising
  an energy storage medium for receiving and storing electric energy supplied from a power source,
  a solenoid and a control switch connectable in series with the energy storage medium and the power source, the energy storage medium is configured to discharge a pulse of current for energising the solenoid when the control switch is activated, whereby the solenoid moves from a first position in which the solenoid is not energised, into a second position in which the solenoid is energised, wherein the energised solenoid is able to generate and supply a current back to the energy storage medium,
  a circuitry unit comprising a processor configured to process the time taken to energise the solenoid; wherein the processor is further configured to monitor the current drawn by the solenoid from the energy storage medium;
  wherein the processor is further configured to control at least one parameter of a discharged pulse; and
  an output module associated with the processor, wherein the output module is configured to be operable by an operator to control the discharge of the current from the energy storage medium to the solenoid.

In some embodiments, the energy storage medium can be a capacitor.

There are several advantageous to the present invention as disclosed herein. The present invention can be used for driving the solenoid from the energy storage medium instead of directly from the power supply. This provides an advantage that the energy of the pulse can be greater than the energy a power source or supply can provide in the same amount of time. Therefore, this can drive a more powerful solenoid from the same power supply or use a smaller power supply for the same strength solenoid. A smaller power supply provides a cost saving in manufacturing cost and uses less power such as electricity during normal use, which saves money and can be environmental friendly.

In another advantage, the processor of device of the present invention can be used for monitoring the current drawn by the solenoid and it can be possible for the processor to obtain or record a dataset. The processor can be further configured to use the information obtained during the monitoring phase to control the duration and strength of the pulse.

In some embodiments, the processor can be a microcontroller.

In some embodiments, the device comprising an advanced circuit can be used to monitor the current that is drawn by the solenoid as it is firing. In some embodiments the current measurement device is realised by placing a small resistor in the path of the current. A microcontroller (or other voltage measuring device) can then be used to measure the voltage across the resistor.

In a standard use of a solenoid, for example providing haptic feedback in an arcade video game system, the solenoid can be powered directly from the available power supply. The power supply feed to the solenoid can be controlled by a basic electronic circuit that can use a transistor to switch the power on and off to the solenoid. As the user plays the video game and performs an action that requires haptic feedback such as pulling a trigger on a gun shaped computer games controller, the games software can send an electronic signal to the device to provide an output such as toggling the transistor and allowing the power to go through to the solenoid.

Typically, this can fire for a pre-determined pulse duration. The firing of the solenoid and a plunger (the centre bolt of the solenoid) can be pulled into the centre of the solenoid. This action movement and impact provides a recoil effect to the user. When that pulse is complete the plunger can then be returned to its original position using a spring.

In some embodiments, at least one parameter of the discharged pulse comprises duration, voltage or current.

In some embodiments, the power source is a USB port.

In some embodiments the device includes a means for increasing or decreasing the voltage available from the power source, for the purposes of being able to set the voltage that is most efficient to power the solenoid.

In some embodiments, the electronic device may further comprise a de-surging means configured to prevent a current surge from being drawn from the power source.

In some embodiments, the de-surging means is an inrush control circuit. Providing an inrush control circuit can be advantageous because it can be used to stop a user from blowing the power source for example by taking too much current from USB Moreover, the inrush control circuit may also be used to stop pushing energy back to power source (usb). For example, a switch can be provided that passes runs the input current through a resistor until the circuit is ready and will therefore not draw excessive current.

In some embodiments, the electronic device may further comprise a decoupling capacitor configured to prevent excessive ripple in the current drawn from the power source and/or to prevent the voltage supply the remainder of the circuitry from dipping in the event that surges of current are drawn by said circuitry. The decoupling capacitor can also be used for smoothing the input current, reducing pulsating effect.

In some embodiments, the electronic device may further comprising a decoupling capacitor configured to prevent excessive ripple in the current drawn from the power source and/or to prevent damage to the power supply in the event that surges of current are drawn by the electronic device.

In some embodiments, a capacitor may be provided including a pre-charge circuit to charge the decoupling capacitor with a limited current and a switch to connect it to the supply once charged.

In some embodiments, the decoupling capacitor can be charged with the circuit as disclosed herein and it can stop a current spike when first connected to a power supply.

In some embodiments, the electronic device may further comprise an interruption means configured to interrupt the current drawn from the power source. The interruption means can be a transistor. Preferably the interruption means takes the form of a switching device in series with the supply current. A transistor can be used to disconnect the electronic device from the power source.

In some embodiments, the device has a means of interrupting the current incoming to the device to provide a means of preventing a current surge on initial connection.

In some embodiments, the means of interrupting the current provides a means of preventing the remainder of the circuitry from operating prior to the decoupling capacitor being switched into the circuit.

In some embodiments, the means of interrupting the current provides a means of placing the circuit into a non-operational state drawing minimal current from the power source.

In some embodiments, there is provided a means of series regulation of current flow from the preceding circuitry into the energy storage device. This can be advantageous as it blocks the current to energy storage medium until circuit in the device hits the minimum required voltage.

In some embodiments, there is provided a means of controlling the voltage supplied to the energy storage device. This allows us to control the amount of energy stored.

In some embodiments, a control switch exists to control the flow of current from the energy storage module to the load solenoid in order to control the current to energize the solenoid. In some embodiments a transistor may be used as a control switch.

In some embodiments, the control switch is further configured to route the power from the solenoid into the energy storage medium. This is advantageous because it enable the recovery of energy from the solenoid at the end of the pulse or period of operation. This is used where the solenoid is a device which (*directly or indirectly) stores energy and can return that energy, a solenoid stores energy in 2 places, in its inductance (coils as magnetic field) and as mechanical potential (such as returning spring).

In some embodiments, the magnitude of current flow in the solenoid can be regulated. This current control may be achieved by modulating the applied voltage applied to the solenoid coil. Preferably this modulation would involve either applying nominally zero voltage across the solenoid coil for a period or reconfiguring the power switches so as to return a portion of the stored energy from the solenoid to the storage means. These methods minimize wasted energy and heat dissipation during the regulation of current.

In some embodiments, there is provided a means of disconnecting the load from the energy source but providing a current path with minimal voltage drop across the load terminals. Preferably the means comprises electronic switches configured to route current from the solenoid to the energy storage device in such a direction as to charge the energy storage device. In some embodiments these electronic switches may be diodes or transistors. Preferably the operation of these electronic switching devices is controlled directly or indirectly by the processor. By cycling between load disconnection as described here, and connection of the load to the energy storage, the magnitude of current flow in the solenoid can be regulated.

In some embodiments, the processor is further configured to measure the current flow through the solenoid or a solenoid switch.

In some embodiments, the electronic device may further comprise a resistor in series with the solenoid coil. By measuring the voltage drop across this resistor, the magnitude and direction of the current flowing in the solenoid coil can be determined. In some embodiments the measurement may be carried out by an analogue to digital converter, which may be integrated into a microcontroller.

There is a means provided for setting the maximum level of current drawing from the power source. The level of current drawn from the power source can be controlled be varying a parameter of the de-surging circuit or the means for increasing or reducing the voltage applied to the energy storage means, or by a combination of these methods. An example of such a control method would be varying the duty ratio of a switch mode regulator used to vary the voltage applied to the energy storage means.

In some embodiments, there is provided a system for controlling the circuitry, which can be connected to a master control system, which can issue commands which may control some or all of the following: output pulse duration, output voltage, output current, maximum current drawn from the power source.

In some embodiments, either, or both, of the discharged (output) pulse duration and output pulse current can be varied by an algorithm based on output voltage, output current, timing or any combination thereof in order to provide the optimum output pulse to achieve a given requirement.

Solenoid performance data can be measured and stored by the device and then transmitted to the application that uses the solenoid so that it can calculate optimum settings for maximum performance.

In some embodiments, the device may further comprise a temperature sensor positioned within the solenoid, wherein the temperature sensor is configured to detect a temperature value of the solenoid and transmit the detected temperature value to the processor.

The data obtained can be calculated by the circuit to give more accurate results.

In some embodiments, the use of device may further provide a method for measuring the current drawn by the solenoid against time and compare this performance data with known measurements of the solenoid and circuit at different temperatures. Therefore, compare to this data and able to provide an accurate calculated estimate of the solenoid temperature.

In some embodiments, machine learning can be deployed for all the measured parameters to calculate the most efficient settings such as pulse duration, solenoid voltage and solenoid current. An example implementation could be while the solenoid is being used with default settings for parameters the machine learning algorithm can collect performance data such as how long the armature in the solenoid takes to impact the maximum and the shape of the current against time graph, the algorithm can then adjust the available parameters in small increments higher and lower in different combinations and again measure the performance. It can then analyse the performance data of the solenoid to decide the optimum parameter settings. It can then continue to adjust the parameters throughout usage and measure the performance and continue to set optimum values. This way if the environment changes for example temperature or the energy storage medium performance fluctuating then the device can continue to calculate the best parameter settings and run at the optimum settings.

When using a reduced duration pulse of energy to the solenoid, after the pulse is completed, if the circuit still provides some electricity to the solenoid (but a smaller amount), this will allow it to be able to measure the changing current and calculate when or if the solenoid has reached its maximum. This measurement is used in other calculations to optimise performance.

The electronic device can also be used to monitor the energy stored in the energy storage medium to use this data in other calculations by the circuit. For example, if a user wants to provide a 10 ms duration high energy pulse to the solenoid but it is known there is not enough energy in the energy storage medium then the algorithm, the user can decide what course of action best suits the use of the circuit or example if opening a door lock with a solenoid, then there is no point firing the solenoid as the door won't open, so it can be better to wait until there is enough energy, but in a recoil solenoid usage, a user might as well fire but have a reduced strength haptic feedback because the user can't wait till more energy has built up as it will be out of sync.

BRIEF DESCRIPTION OF THE DRAWINGS

The invention will now be further and more particularly described, by way of example only, and with reference to the accompanying drawings, in which.

DETAILED DESCRIPTION OF THE EMBODIMENTS

Figure 1:
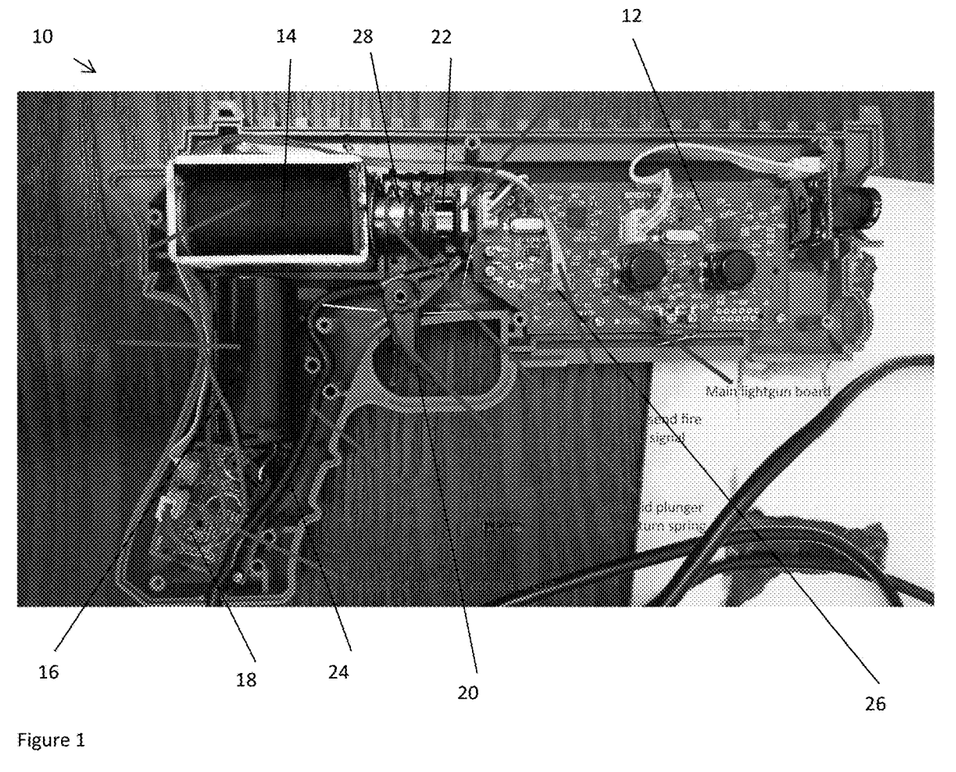
FIG. 1 shows the electronic device according to the present invention.

Referring to FIG. 1, there is shown an electronic device 10. The electronic device may comprise a circuit 12 for processing, controlling, monitoring a current between a power source (not shown in the accompanying figure) and a solenoid 14. An energy storage medium such as a capacitor 16 is provided for receiving and storing electric energy supplied from a power source.

The solenoid 14 can be connected to a control switch, which can be connectable in series with the energy storage medium 16 and the power source, the energy storage medium 16 is configured to discharge a pulse of current for energising the solenoid 14 when the control switch is activated, whereby the solenoid 14 moves from a first position in which the solenoid 14 is not energised, into a second position in which the solenoid 14 is energised, wherein the energised solenoid 14 is able to generate and supply a current back to the energy storage medium 16.

A circuitry unit comprising a processor 18 i.e. the advanced solenoid control circuit shown in FIG. 1 is configured to process the time taken to energise the solenoid 14; where the processor 18 is further configured to monitor the current drawn by the solenoid 14 from the energy storage medium 16. The processor 18 is further configured to control at least one parameter of a discharged pulse and an output module, such as a trigger 20 as shown in FIG. 1, is associated with the processor 18, where the output module 20 is configured to be operable by an operator to control the discharge of the current from the energy storage medium 16 to the solenoid 14.

Referring to FIG. 1, there is also shown a computer games lightgun that connects to a computer using a USB interface. It shows a recoil mechanism as described in this patent. The main features include:

A solenoid which when energised provides a desired recoil effect, this includes: A solenoid coil 28 which becomes an electromagnet when energised and a armature/plunger 28 which is the part of the solenoid mechanism that physically moves when attracted by the solenoid coil.

FIG. 1 shows a capacitor that acts as the energy storage medium;

a physical trigger which provides the event to action the recoil event;

an impact plate 22 for the solenoid armature to impact with when the return spring pulls the armature back;

a USB cable 24 to connect to the computer which provides communication and the energy source for the circuit;

an advanced solenoid control circuit 18 hereby also known as an SCC;

a main lightgun board 12 which provides the lightgun functionality; and a cable 26 to send communication between the main lightgun board that provides lightgun functionality and the solenoid control circuit (SCC).

A computer games lightgun with recoil effect solenoid, configured to provide a pulse duration long enough to last until the plunger has hit the maximum. To provide maximum haptic feedback, a large solenoid is used that in normal usage would require too much current and energy to be used via a USB power source. With the advanced solenoid circuit this large solenoid is able to be used and provide super performance including haptic feedback.

A Lightgun is connected to the computer via a USB cable which also provides the power (5V and a maximum of 500 mA). The advanced solenoid circuit initiates Inrush control circuit prevents the device from drawing excessive current at the moment of connection to the USB port.

A decoupling capacitor provides a low impedance source to supply short term current peaks drawn by the downstream circuitry. It then recharges when current demand falls, thus reducing ripple in the current draw from the source.

The decoupling capacitor is initially charged by a limited current, thereby preventing a current spike from being drawn. At the same time, the energy storage capacitor is pre-charged.

While the capacitors are being pre-charged, the microcontroller performs initialization routines and configures control signals to the hardware, ready to begin operation. Once the decoupling capacitor has reached a suitable level of charge and the initialization is complete, the microcontroller enables the power input circuitry. At this point, a switch connects the decoupling capacitor to the supply rail via a low resistance path.

The enabling of the power circuit also causes another switch to route power to the voltage boost circuit.

The current it can draw is limited to 350 mA. This is because the rest of the lightgun needs current also and it is important not to exceed the 500 mA limit of the USB power source.

The user starts playing a game which has recoil effect enabled.

User pulls the trigger which activates a switch which is read by the main lightgun board. Therefore the solenoid needs to fire to provide haptic feedback. The lightgun board sends a "fire" solenoid signal over a cable to the solenoid control circuit.

The solenoid control circuit uses a transistor to route power from the capacitor to the solenoid.

The solenoid plunger starts moving towards the centre of the coil. The solenoid control circuit from here on known as the SCC, measures the current drawn from the solenoid. It looks for a low point in the current drawn which represents the trough shown on FIG. 1. This means the solenoid plunger has reached its maximum. It then ends the pulse. This saves energy and prevents the solenoid from overheating.

The Inductance in the solenoid coil now converts to electricity which is routed by the SCC back into the capacitor to recover as much of the energy as it can. Additionally the moving plunger being pushed back into its starting position by the return spring moving through the magnetic field in the coil also creates electricity which is routed into the capacitor.

The capacitor continues charging from the USB power during these events.

The user pulls the trigger again, very quickly after the last time. As the capacitor was provided with the retrieved energy from the solenoid and it has also has a small amount of time in between firing to charge, it now has enough energy to do another pulse and fire the solenoid and the plunger reach the maximum and provide good haptic feedback.

If the SCC was not used, then there would not be enough energy to fire the solenoid so quickly again and a smaller strength solenoid would need to be used (so worse haptic feedback performance), or an external power supply provided (more cost and less convenient).

Additionally if the SCC was not used and an external power supply was used then there would be more heat generated due to less efficient pulses which means the solenoid would need to be deactivated when it got too hot. Which stops the haptic feedback working. A temperature sensor would need to be added to the solenoid. The extra heat would mean the solenoid was more likely to fail quicker.

The device comprising an advanced circuit as disclosed herein in the present invention aims to improve the scenario described above in the following ways:

Driving the Solenoid from an Energy Storage Medium Instead of Directly from the Power Supply This is a known solution in electronics to use an energy storage medium such as a capacitor or a battery to charge from the power supply. Then when required use this stored energy in a pulse to activate a solenoid. This provides an advantage that the energy of the pulse can be greater than the energy a power supply can provide in the same amount of time. Therefore, this drives a more powerful solenoid from the same power supply or use a smaller power supply for the same strength solenoid. A smaller power supply provides a cost saving in manufacturing cost and will use less electricity in normal use which saves money and is good for the environment.

Figure 2:
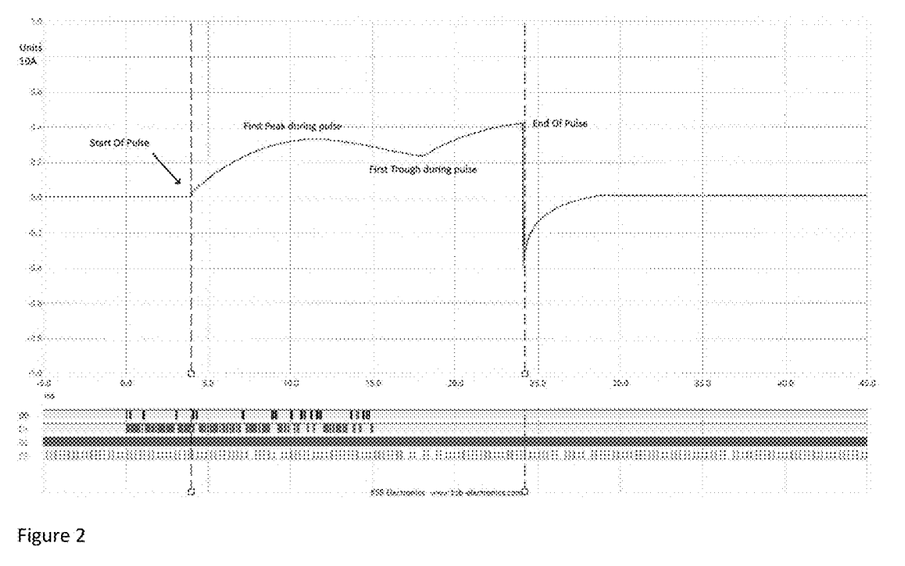
FIG. 2 shows a typical solenoid current against time graph

Referring to FIG. 2, there is shown a graph illustrating the monitoring of the current drawn by the solenoid by the processor. From the information obtained through monitoring of the current, the processor can be further configured to control the duration and strength of the pulse.

The advanced circuit as disclosed herein is able to monitor the current that is drawn by the solenoid as it is firing. A small resistor can be provided within the circuit on the path the electricity is supplied. The processor, such as a microcontroller or other voltage measuring device, can provide to measure the voltage across the resistor. Using the electronics formula:

$$Voltage = Current \times Resistance$$

As the resistance is a known value, when the voltage is measured and then deduce the current. A firing solenoid draws a different amount of current during its action as shown by FIG. 2 a typical solenoid current against time graph.

Referring to FIG. 2, the end result is that by monitoring the current drawn, the user can work out where in the cycle the solenoid plunger is. The first peak will normally be at the point of maximum acceleration and the first trough is actually where the plunger has reached the end of its journey. A normal solenoid circuit will use a set pulse and as shown on the graph, the solenoid still uses significant amounts of current after it has reached its maximum. This wastes energy and generates heat which long term causes more wear and tear on the solenoid.

The advanced circuit therefore monitors the current and looks for the trough in FIG. 2. After calculating the trough point has occurred then the circuit ends the pulse. This means the circuit is not wasting energy by supplying significant energy after the solenoid has reached its maximum. This reduces the energy required per pulse, reduces the waste heat generated and also increase the life of the solenoid. By using less energy it means with a limited amount of energy available you can fire more full strength solenoid actions in the same amount of time.

Monitoring the Current to Create an Even More Efficient Pulse

The last section described the most efficient way to do a full strength pulse. However there is still an opportunity to do an even more efficient lower energy pulse and still have the plunger reach its maximum within the solenoid. If you stop the pulse before the plunger has the maximum there is still a certain length of pulse where the plunger has enough momentum to still hit the maximum. This innovation uses the monitored solenoid current to calculate the point where the pulse can end early but still achieve its aim of reaching the maximum.

As the simplest implementation, the circuit can perform a calibration process to work out the optimum pulse. It can fire a normal pulse and measure where the trough as shown on the FIG. 1 graph occurs. This is the starting duration of the pulse. It can then reduce the time of the pulse to see whether the plunger still reaches the maximum. So for example on the example showed on the FIG. 1 graph the duration of pulse was 14 ms for the plunger to hit maximum. A good first estimate for an optimum duration value is on the first peak as shown in FIG. 1. This occurs after 8 ms. So the calibration routine can then try 8 ms as a pulse. After 8 ms it reduces the current or voltage on the pulse to a much smaller value. This is because some current still needs to flow to be able to measure when the plunger has reached the maximum (by measuring the trough point as shown on FIG. 1). If the trough event occurs in the measured data then the circuit knows the plunger reached the maximum, the circuit can then slowly decrease the pulse to work out the most efficient pulse duration to reach maximum. If the trough event doesn't occur then it can slowly increase the pulse duration to work out the optimum point. In normal use when you find the optimum point you would most likely add a bit more time to the pulse to ensure there is room for error and that it still reaches the maximum.

This value can change through use with changes in temperature and other factors that can affect electrical circuit performance. So in this simple circuit you need to keep monitoring that it reaches the maximum or you need to increase the pulse duration.

A more advanced circuit can decide how long the pulse duration should be after it has reached the first current peak as shown on FIG. 1. This way when factors such as temperature change the peak on the graph will move position. Therefore because the pulse is set to last a duration after the peak, the circuit will dynamically adjust during use based on changing factors such as temperature.

A very advanced version of the circuit could use machine learning and calculate the optimum pulse by measuring all the data values and learning what values result in a successful plunger reaching maximum event. It would continually measure the variables during operation to maintain the optimum pulse length.

In the example first provided describing haptic feedback in an arcade video game system you don't just want the plunger to make the maximum but also want it to hit the maximum with a good enough force to provide good haptic feedback. So in the algorithms described above you would likely add a set duration of pulse on top of your optimum pulse to make sure it hits with the required force. Where as in a scenario where you just need the solenoid plunger to reach the maximum then you don't need to add on an additional length pulse.

You can see as shown on FIG. 1 that if you were able to reduce the pulse starting from the first peak at 8 ms pulse duration instead of 14 ms which is when the maximum is reached, then the pulse only needs to last 57% as long which is a substantial energy saving.

Recovering Energy after a Solenoid Plunger has Reached the Maximum

At the point the solenoid plunger has reached the maximum it has actually built up substantial energy in the solenoid. If this energy could be recovered then if the solenoid is using a power source with a limited amount of energy then it would be able to action the solenoid again with a smaller wait time in between.

The solenoid has stored up energy in the inductance stored in the coil and also mechanical energy as the plunger has a return spring that will return it back to the starting position. The advanced circuit is designed to route energy from both these sources back into the energy storage medium.

As the inductance reduces it naturally converts into electricity back into the circuit. By changing the path the energy travels in the circuit this energy is switched to travel back into the capacitor.

As the plunger is returned back to its started position by the return spring it travels though the magnetised solenoid coil. This is the opposite of what it did when it was first activated and therefore it converts the magnetic energy to electrical energy instead. This electrical energy is also routed to travel back into the capacitor.

By recovering energy from both of these sources it means the overall energy used during a pulse is less and therefore you can fire the solenoid with a shorter duration of waiting in between.

Measuring the Temperature of a Solenoid without a Temperature Sensor

It is very common for solenoids to be used in a system in a circuit with a temperature sensor to measure the temperature of the solenoid. This is so the circuit can shut off solenoid functionality if the solenoid is over-heating. Too much heat can damage a solenoid and reduce its lifetime.

The pattern of current against time during the action of a solenoid follows a set pattern with a known curve, however the exact parameters of the curve change against temperature when all other variables are consistent. For a solenoid these can be measured against different temperatures. Then when measuring these parameters against known parameters it is possible to deduce what the temperature of the solenoid is. Therefore a temperature sensor is not required to be added to the circuit which is a cost saving.

If there any other variables that might affect the parameters other than temperature then it is possible to measure these also to remove their effect from the calculation. So for example a capacitor gets less effective over time. So if you measure the voltage across the fully charged capacitor you will be able to measure if it has reduced performance and you can use that measurement of reduced performance as a variable in your temperature calculation to get a more accurate result.

EXAMPLES

In computer game hardware solenoids are commonly used to provide haptic feedback to the user. The most common standard for computer games controllers such as gamepads and lightguns use a USB connection. A typical USB2 connection which is a very common standard supplies 0.5 mA of current per port. A typical solenoid that can action under that current would be very small and only supply minimal haptic feedback to the user. If the solenoid was for example trying to make the user of a lightgun feel like they were firing a real gun a small non-powerful solenoid will not give this feeling.

So there is a need to use a much more powerful solenoid that has a current requirement higher than the available current on USB2. It is possible to use an external power supply but this adds cost and also additional wiring which is not desirable.

It is possible to use the configuration described in the description where an energy storage medium is used to build up the energy to fire the solenoid. In this example a capacitor is used. However even with this configuration there will be a solenoid that requires too much energy and will take too long in between actions for the capacitor to charge in time for the next action.

Using the technology as described in this patent a more powerful solenoid can be used than otherwise would be possible. This is because of the efficiency improvements which means a shorter duration electrical pulse can be used to achieve the same solenoid plunger maximum.

Then as the solenoid returns back to the starting position energy is recovered which means the circuit gets a head start on collecting enough energy required for the next pulse.

So if the user is playing a lightgun game and is rapidly firing virtual shots, the solenoid will need a smaller amount of energy to fire and will also recover quicker for the next firing. The net benefit of these innovations is that a stronger solenoid can be used than otherwise would be possible for the amount of electrical power available and this stronger solenoid gives better haptic feedback to the user.

Example Circuit

Figure 3:
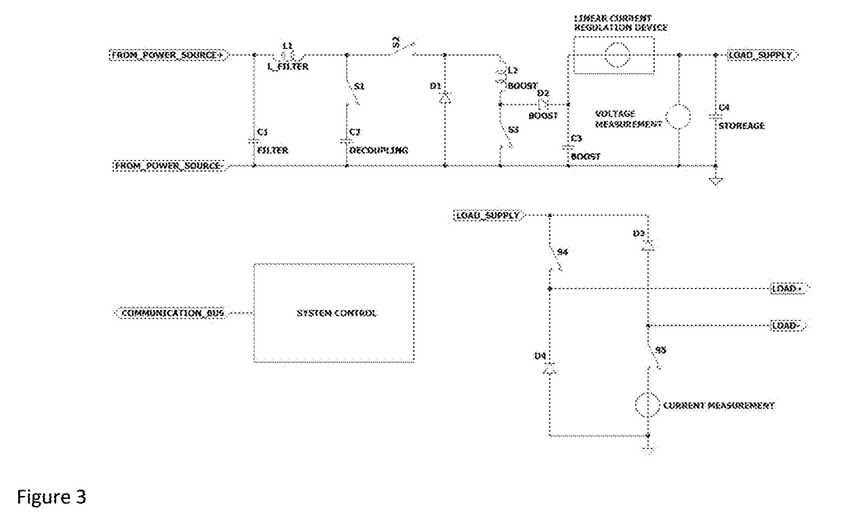
FIG. 3 show an advanced circuit according to the present invention.

The following is an example circuit showing an implementation of the technology described in this patent:

Referring to FIG. 3, there is provided a schematic example of the circuit deployed in the present invention. At the initial application of power from the power source, switches S1, S2 and S3 will be open. No power will be available at LOAD SUPPLY.

The SYSTEM CONTROL will configure switches S4 and S5 into the open state. C2 will charge towards the potential at POWER SOURCE+ via current limiting element R1. C3 will also receive charge via D5.

The LINEAR CURRENT REGULATION DEVICE will prevent significant current from flowing into C4, the STORAGE device.

SYSTEM CONTROL will close switches S1 and S2. Hardware will prevent these switches from closing before the voltage across C2 reaches a pre-defined threshold.

C3 was already charged to near the potential of the POWER SOURCE, so now the potential at both ends of D2 and L2 will be close to that of POWER SOURCE+

S3 will close. The potential at the junction of L2 and D2 will fall to that of POWER SOURCE−.

Current will begin to flow through L2 and S3. This will rise as magnetic flux builds in L2's core.

At a current threshold determined by SYSTEM CONTROL, S3 will open. Current will continue to flow through L2 via D2 into C3. As charge builds in C3 the potential across it will rise. The potential across L2 will now have the opposite polarity, potential at the junction of L2 and D2 being higher than that of the incoming supply, therefore the current flow in L2 will begin to reduce.

After a period, S3 will switch on again until the current in L2 is restored to the required threshold.

This cycle will repeat causing the voltage at the junction of D2 and C3 to rise. As this potential rises, the LINEAR CURRENT REGULATION DEVICE will allow current to flow into C4, the STORAGE device.

As charge flows into C4, the potential at LOAD SUPPLY will rise. When this potential reaches the desired level for solenoid operation, the cycling of S3 will stop. As there will be some current drain from LOAD SUPPLY due to circuitry and losses, S3 may continue to operate, but switching at a lower current threshold, in order to maintain LOAD SUPPLY at the desired potential.

The solenoid coil is connected between LOAD+ and LOAD−. When the solenoid is to be energized, S4 and S5 will both close. This will allow current to flow from LOAD SUPPLY, through S4, the solenoid coil, S5, the CURRENT MEASUREMENT DEVICE and back to C4.

The current in the solenoid coil will be measure by CURRENT MEASUREMENT DEVICE and this value made available to SYSTEM CONTROL. At the end of the solenoid energization period, S4 and S5 will both be opened.

Current will continue to flow in the solenoid coil, now taking the path D4, solenoid coil, D3 and into C4 thereby returning charge to C4.

The hardware topology allows for another mode of operation. In the case that the current flow in the solenoid coil is to be limited to a certain level, S4 can be opened with S5 closed. Now current will flow through the path D4, solenoid coil, S5 and the CURRENT MEASUREMENT DEVICE. The potential difference across the solenoid terminals will be low, and therefore the current will decrease only slowly. Current measurement will still be possible. At the end of a period, S4 can be closed and solenoid current will begin to rise again.

The operation of the circuit results in sudden discontinuities in the quantity of current drawn from the supply. These very high rates of change of current can cause radio interference, dips and peak in the supply voltage and could disrupt the operation of the device supplying the power. Once S1 is closed, C2 provides a low impedance source for sort term current demands. When current demand suddenly drops, the supply voltage will tend to increase a little and C2 will draw current. This action smooths out the sudden changes in current draw from the upstream supply. The charge flows in and out of C2 will create a small voltage ripple across its terminals. L1 and C1 form a filter to attenuate this ripple and allow the small voltage changes to occur across C2 without significant current ripple, even of the POWER SOURCE has a very low output impedance.

There now follows a detailed description of the electronics and physics being used in this example:

This detail outlines the methods used for automatic control of a solenoid used in a "recoil" feature of a Lightgun. This description also includes an explanation of some of the theory underpinning these methods and the possible enhancements or alternative that could be employed or that have been considered.

Physical Principle of the Solenoid

Figure 4:
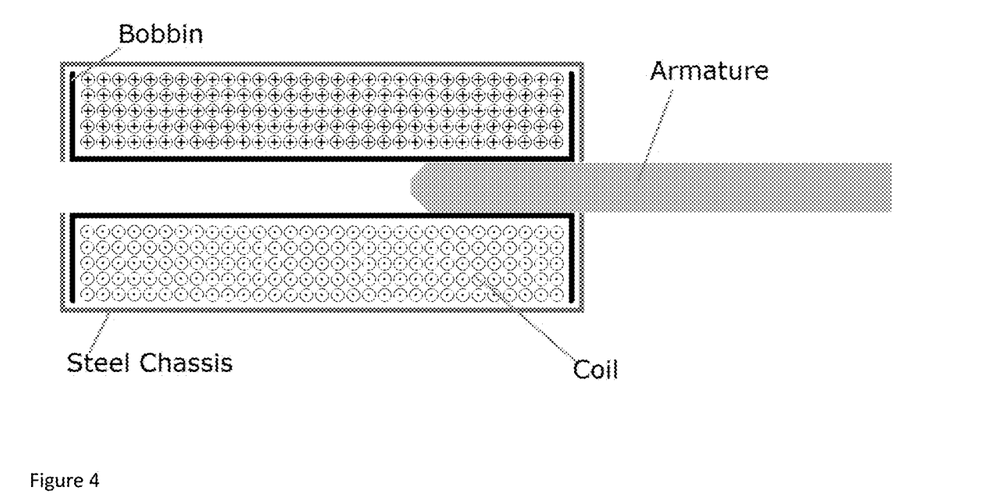
FIG. 4 provides a cross Section of a solenoid.

FIG. 4 provides a cross Section of a solenoid. As referred to in FIG. 4, the solenoid actuator consists of a coil of wire on a bobbin which has a hollow round tubular centre. The outside of the coil is surrounded by a steel casing. An iron armature is placed into the tubular centre such that it can slide in and out freely. In the application it is held in position with a spring, so that it is protruding out of the solenoid bobbin. The outer end of the armature rests against a striker plate.

Figure 5:
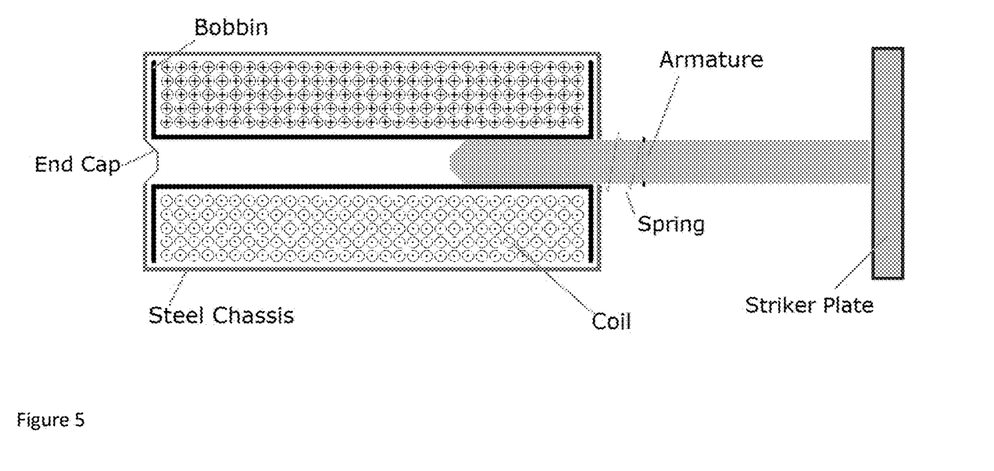
FIG. 5 shows an illustration of a solenoid in a Lightgun application.

FIG. 5 shows an illustration of a solenoid in a Lightgun Application. In the application, the solenoid is energized, pulling the armature into the solenoid bobbin. A steel end cap stops the armature when it reaches the far side of the bobbin. The magnetic force accelerates the armature away from the striker plate, but also pulls the solenoid body towards the bulk of the armature. As the solenoid body is fixed to the gun housing, with the striker plate towards the gun barrel, this force initially pulls the gun forwards. When the armature hits the end cap, it decelerates rapidly and exerts a large force on the end cap. This force acts to push the gun backwards. At this point the spring is compressed. The spring now exerts a force on the armature, accelerating it towards the striker plate. This force also acts to push the gun backwards. Once the armature hits the striker plate, it once again decelerates rapidly exerting a force on the striker place, and forcing the gun forwards. This cycle of forces is felt by any user holding the gun and gives a simulated recoil effect (although genuine recoil is all backwards force). The impacts of the armature also generate a sharp noise, adding to the realism of the gun firing.

Physics of Control

The lightgun is powered from a computer USB port. This limits the maximum power that it can draw to (assuming standard USB 1 or 2) to 2.5 W nominally. It is therefore important to maximize the physical effect that can be achieved with this limited power.

An analysis of the operation of the solenoid system allows a practical system of control to be determined.

Basic Principle of Operation

Figure 6:
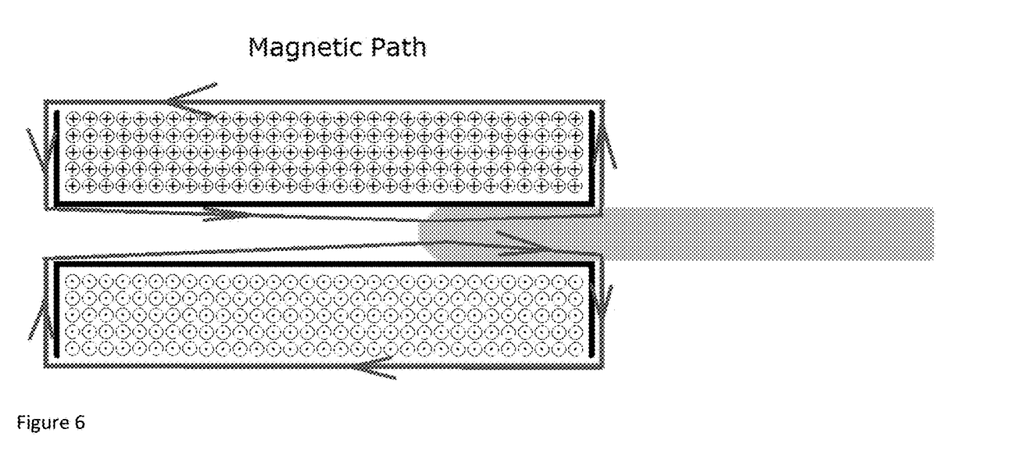
FIG. 6 shows a magnetic Path in the Solenoid.

When a current is passed through the wire coil, a magnetic field is generated around the windings. The bulk of the magnetic flux will flow in the lowest reluctance paths. As the permeability of the steel chassis is much lower than the surrounding air, it provides a good magnetic path around the outside of the coil. When the armature is out of the bobbin, this return path for this flux is through the air in the hollow tubular centre of the bobbin. This is a relatively high reluctance path and the flux will be low. As the armature is introduced into the centre of the bobbin it creates a lower reluctance path for the flux. The armature will experience a force, pulling in the direction in which it decreases reluctance, and therefore increases flux.

FIG. 6 shows a magnetic path in the solenoid. FIG. 6 shows the path that the magnetic flux takes as the armature enters the bobbin. It can be seen that as the armature replaces air in the centre of the coil, it will shorten the path through the air, and replace it with the high permeability iron, thus the path reluctance falls as the armature moves further into the bobbin. The resulting force accelerates the mass of the armature.

Physical Laws Governing the Solenoid Operation

If we consider coil of copper wire in which current can flow, each turn of wire will have an electrical resistance. A loop of wire with current flowing in it will create a magnetic field, flowing around the wire, at 90 degrees to the direction of current flow. The magnetic flux will be proportional will be proportional to the current, and will be determined by current flowing in the loop, divided by the total reluctance of the path around the magnetic path. Specifically, $$\Phi = \frac{F}{Rel} \quad \text{Equation 1}$$

Where $\Phi$ is total flux in webers
F is Magnetomotive force in amperes
Rel is magnetic path reluctance $H^{-1}$ Also, the voltage induced in the loop (or a turn of the coil) is $$E = \frac{\delta\phi}{\delta t} \quad \text{Equation 2}$$

Where E is induced potential in Volts.
By combining Equation 1 and Equation 2 we get:

$$E = \frac{\delta\left(\frac{F}{Rel}\right)}{\delta t} \quad \text{Equation 3}$$

As F is total current, then F=Coil current (i) in amperes times number of turns (N) and E is the voltage induced in each turn, assuming that all the flux passes through all the turns, therefore $$\frac{E}{N} = \frac{\delta\left(\frac{Ni}{Rel}\right)}{\delta t} \text{ So } E = N^2 \frac{\delta\left(\frac{i}{Rel}\right)}{\delta t} \quad \text{Equation 4}$$

As inductance(L) in henrys is defined as induced volts per amp/second.

Inductance $$L = \frac{E}{\left(\frac{\delta i}{\delta t}\right)} \quad \text{Equation 5}$$

Combining Equation 4 and Equation 5 gives $$L = \frac{N^2}{Rel} \quad \text{Equation 6}$$

Examining the term $$\delta\left(\frac{i}{Rel}\right)$$

from Equation 4, and applying partial differentials of time dependent variables i and Rel, by superposition we get $$E = N^2\left[\left(\frac{1}{Rel}\right)\frac{\delta i}{\delta t} + i\frac{\delta\left(\frac{1}{Rel}\right)}{\delta t}\right] \quad \text{Equation 7}$$

Considering Equation 6, we can re-write Equation 7 as $$E = L\frac{\delta i}{\delta t} + i\frac{\delta L}{\delta t} \quad \text{Equation 8}$$

Figure 7:
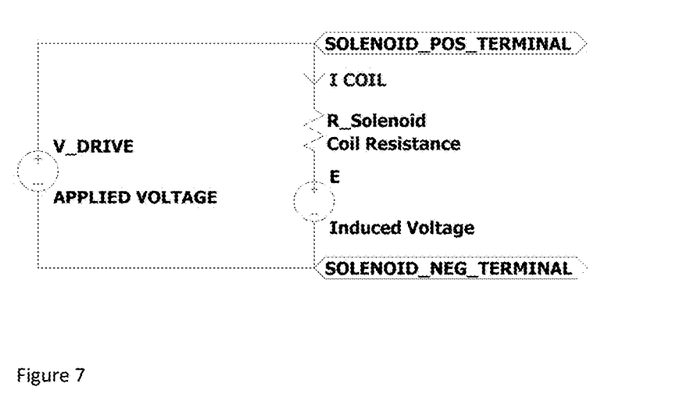
FIG. 7 shows a solenoid circuit.

The effective electrical circuit of the solenoid coil can be represented by a Solenoid Circuit as shown in FIG. 7.

The applied voltage across the solenoid terminals (Vapp) is derived as:

$$V_{app} = L\frac{\delta i}{\delta t} + i\frac{\delta L}{\delta t} + iR_{solenoid} \quad \text{Equation 9}$$

Or by rearranging $$i = \frac{V_{app} = L\frac{\delta i}{\delta t} + i\frac{\delta L}{\delta t}}{R_{solenoid}} \quad \text{Equation 10}$$

As $$L = \frac{N^2}{Rel}, \quad \text{(Equation 6)}$$

and Rel is the reluctance of the magnetic circuit, which falls as the armature is pulled further into the solenoid body, L will be inversely related to the distance that the armature has travelled from its resting position at the striker plate. Rel may not be linearly related to this distance, but as the distance increases Rel will fell and hence L will rise. We can then say that $$\frac{\delta L}{\delta t}$$

will be related to the velocity of the armature, and will be positive as the armature moves towards the solenoid body.

With these facts in mind, we can examine the current waveform and look at the implications of the physical laws.

Figure 8:
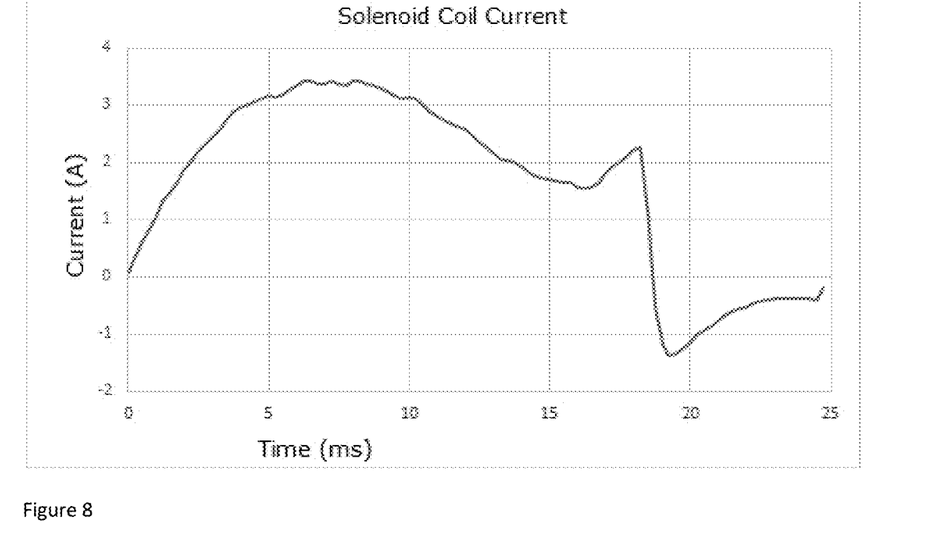
FIG. 8 shows a solenoid current waveform.

FIG. 8 shows a solenoid Current Waveform. The solenoid driver in the Lightgun Recoil option applies an essentially fixed voltage to the solenoid coil and measures the current. FIG. 8 shows the current waveform as measured by the solenoid drive during an actual operation of the solenoid. In this case no automatic pulse termination was enabled and the pulse was a fixed duration. At the beginning of the waveform, in the first moments after the voltage is applied, the armature is stationary or its velocity is very low, so the term $$i\frac{\delta L}{\delta t}$$

approximates to zero.

Equation 10 then becomes $$i = \frac{V_{app} - L\frac{\delta i}{\delta t}}{R_{solenoid}} \quad \text{Equation 11}$$

Rearranging gives $$\frac{V_{app} - iR_{solenoid}}{L} = \frac{\delta i}{\delta t} \quad \text{Equation 12}$$

While the current is low, such that $iR_{solenoid} \ll V_{app}$, we can further simplify this equation to $$\frac{\delta i}{\delta t} = \frac{V_{app}}{L} \quad \text{Equation 13}$$

This implies a linear rate of rise which depends on the applied voltage and the initial inductance of the solenoid. This can be observed in the waveform in FIG. 8.

As the current rises, the term $iR_{solenoid}$ becomes more significant, causing the rise rate to decrease. The increasing current causes in increasing force to be applied to the armature and it begins to accelerate towards the solenoid body. This makes the term $$i\frac{\delta L}{\delta t}$$

positive and acts to further attenuate the rising current. Eventually the current reaches a peak. Around the peak $$\frac{\delta i}{\delta t}$$

is approximately zero, so for this region of the waveform Equation 10 can we rewritten as $$i = \frac{V_{app} - i\frac{\delta L}{\delta t}}{R_{solenoid}} \quad \text{Equation 14}$$

Solving Equation 14 for i gives:

$$i = \frac{V_{app}}{R_{solenoid} + \frac{\delta L}{\delta t}} \quad \text{Equation 15}$$

As $V_{app}$ and $R_{solenoid}$ are fixed quantities, then it can be seen that for a given level of i at the peak, there must be a corresponding value of $$\frac{\delta L}{\delta t}.$$

As $$\frac{\delta L}{\delta t}$$

is a function of armature velocity, this implies that a certain velocity has been reached at the peak of the current. This is not strictly true as L does not have a linear relationship to position (displacement of the armature), so the exact position as well as velocity will have an impact on $$\frac{\delta L}{\delta t}.$$

After the peak, the current falls, so $$L\frac{\delta i}{\delta t}$$

will be negative.

Rearranging Equation 9 gives:

$$\frac{\delta L}{\delta t} = \frac{V_{app} - L\frac{\delta i}{\delta t}}{i} - R_{solenoid} \quad \text{Equation 16}$$

As the waveform progresses beyond the peak, $$\frac{\delta i}{\delta t}$$

changes from zero to an increasingly negative value as current begins to fall. As $$\frac{\delta i}{\delta t}$$

becomes more negative, $$V_{app} - L\frac{\delta i}{\delta t}$$

becomes more positive. As i is falling at this point, $$\frac{V_{app} - L\frac{\delta i}{\delta t}}{i}$$

must be increasing. $R_{solenoid}$ is constant, so $$\frac{\delta L}{\delta t}$$

must be increasing, so we can conclude that the armature is still accelerating.

This phase of the waveform continues until the armature encounters the end cap. At this point the armature decelerates rapidly and comes to rest. At this point the term $$\frac{\delta L}{\delta t}$$

will be zero therefore:
the value of $$\frac{\delta i}{\delta t}$$

will be given by $$\frac{V_{app} - iR_{solenoid}}{L}$$

from Equation 12
The results in an abrupt change to a positive of $$\frac{\delta i}{\delta t}$$

for the remainder of the waveform. Following this point any electrical energy flowing into the solenoid will be wasted and not contribute to the kinetic energy in the armature. Any magnetic field, resulting from current flow in the solenoid coil, will act to retain the armature at the end cap position. The spring will act to accelerate the armature away from the end cap and towards the striker plate. For this reason its desirable, from an efficiency point of view, to de-energize the coil either before or very close to the end cap impact time.

Parameterization and Control Strategy

In order to determine the best point to de-energize the system in real time it is necessary to develop a strategy that allows parameters to be applied to the measured current waveform in real time.

Figure 9:
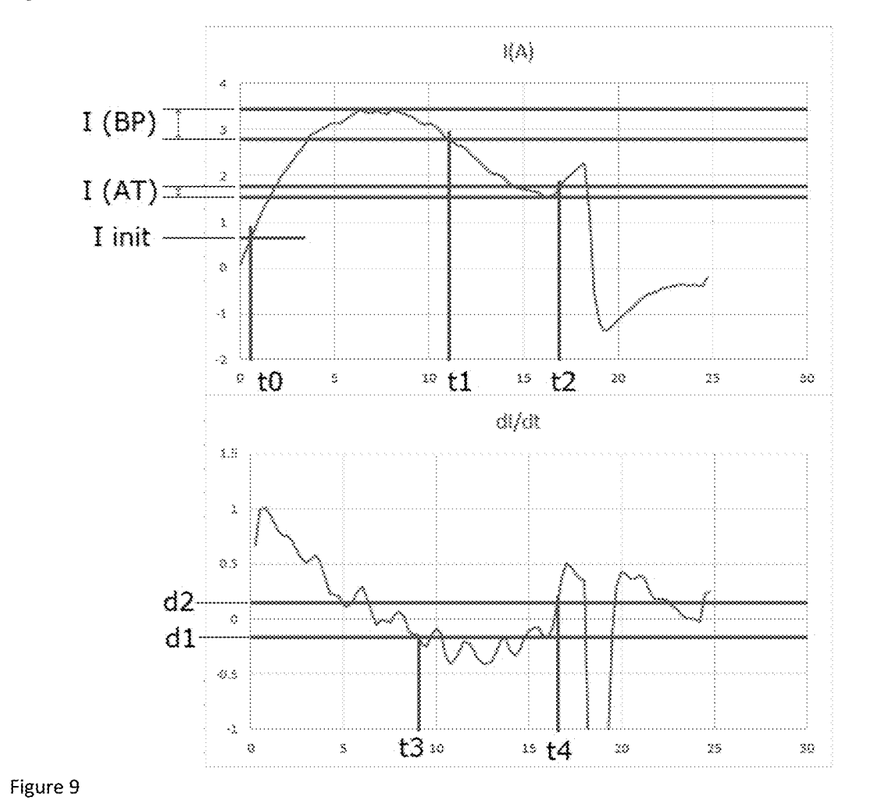
FIG. 9 shows a current waveform processing and parameters.

FIG. 9 shows an actual current waveform measured by the solenoid driver and the processing and parameters applied to it. For the reasons developed in the preceding text, it is desirable to turn de-energize between the current peak and the subsequent trough, which corresponds to the armature hitting the end stop.

The strategy is applied, using the parameters, in real time to the waveform and identifies up to 5 time points (t0 to t4). Any of these time points, or a combination of them, can be used to trigger termination of the pulse and de-energization of the solenoid.

There are 2 threads to the strategy. The first thread is based on a filtered version of the real time current waveform. The first parameter is $I_{init}$. This is a current threshold that specifies a level. At the point that the solenoid is first energized ($V_{app}$ is applied across its terminals), a short blanking timer is started. During the period of the blanking timer the current is ignored. This is to prevent the controller from reacting to any initial current spike resulting from the switching of the power control circuit. The time point t0 is defined as the first time that the instantaneous value of the filtered solenoid current exceeds $I_{init}$. Following t0, the highest level that the filtered current reaches is recorded as $I_{peak}$. Time point t1 is defined at the first time that the filtered current falls below $I_{peak}$ by $I_{BP}$. Once t1 has been reached the lowest value of filtered current is recorded as $I_{trough}$ and this record is continuously updated. Time point t2 is defined as the first time, after t1, that the value of filtered current exceeds $I_{trough}$ by $I_{AT}$.

The second thread of the strategy is based on the first derivative of the current. The solenoid driver performs real time digital signal processing to derive this signal. Two thresholds are defined by are defined by parameters d1 and d2. Time point t3 is defined as the first time after t0 that $$\frac{\delta i}{\delta t}$$

falls below threshold d1. Time point t4 is defined as the first time after t3 that $$\frac{\delta i}{\delta t}$$

exceeds threshold d2.

Various further aspects and embodiments of the present invention will be apparent to those skilled in the art in view of the present disclosure.

"and/or" where used herein is to be taken as specific disclosure of each of the two specified features or components with or without the other. For example "A and/or B"

is to be taken as specific disclosure of each of (i) A, (ii) B and (iii) A and B, just as if each is set out individually herein.

Unless context dictates otherwise, the descriptions and definitions of the features set out above are not limited to any particular aspect or embodiment of the invention and apply equally to all aspects and embodiments which are described.

It will further be appreciated by those skilled in the art that although the invention has been described by way of example with reference to several embodiments. It is not limited to the disclosed embodiments and that alternative embodiments could be constructed without departing from the scope of the invention as defined in the appended claims.

The invention claimed is:

1. A gaming controller configured to provide a recoil effect when a trigger is pulled, the gaming controller comprising:
   a solenoid including a plunger movable between a first non-energised position and a second energised position when a current pulse is applied in response to pulling the trigger;
   a capacitor configured to draw and hold current; a current measuring device configured to monitor the current drawn by the solenoid when the trigger is pulled;
   a switch configured to enable the harvesting of energy from the energised solenoid back into the capacitor; and
   a control circuitry configured to control at least one parameter of the current pulse and to terminate the current pulse based on the monitored current drawn.

2. The gaming controller according to claim 1, wherein the parameter of the pulse is the duration, voltage or current of the current pulse.

3. The gaming controller according to claim 1, wherein the capacitor draws current from an external power source.

4. The gaming controller according to claim 3, wherein the external power source is a USB port.

5. The gaming controller according to claim 3, wherein the control circuitry further comprises a de-surging circuit configured to prevent a current surge from being drawn from the power source.

6. The gaming controller according to claim 5, wherein the de-surging circuit is an inrush control circuit.

7. The gaming controller according to claim 3, further comprising a decoupling capacitor configured to prevent excessive ripple in the current drawn from the power source.

8. The gaming controller according to claim 7, wherein the decoupling capacitor is further configured to prevent damage to the power supply in the event that surges of current are drawn by the gaming controller.

9. The gaming controller according to claim 1, further comprising a transistor configured to interrupt the current drawn from the power source.

10. The gaming controller according to claim 1, wherein the control circuitry is further configured to route the power from the solenoid into the capacitor.

11. The gaming controller according to claim 1, wherein the processor is further configured to measure the current flow through the solenoid.

12. The gaming controller according to claim 1, further comprising a temperature sensor positioned within the solenoid, wherein the temperature sensor is configured to take into account the reading of the temperature sensor when controlling the at least one parameter of the current pulse.

13. The gaming controller according to claim 1, wherein the solenoid further comprises a spring and wherein the energy stored in the spring due to the plunger depressing the spring is converted back to electrical energy and recovered to the capacitor.

14. The gaming controller according to claim 1, wherein the movement of the plunger from the first non-energised position to the second energised position results in inductance inside the solenoid, which is also converted to electrical energy and recovered to the capacitor.

15. The gaming controller according to claim 1, wherein the gaming controller is a lightgun.

16. The gaming controller according to claim 1, wherein the control circuitry is configured to:
   identify a time indicative of the plunger having sufficient momentum to reach the second, energised position; and
   terminate the current pulse at the identified time.

17. The gaming controller according to claim 16, wherein the second energised position corresponds to an end point of the plunger within the solenoid.

* * * * *